(12) United States Patent
Lagsdin

(10) Patent No.: US 7,802,814 B2
(45) Date of Patent: Sep. 28, 2010

(54) STABILIZED PAD FOR VEHICLES

(76) Inventor: Andry Lagsdin, 54 King Hill Rd., Hanover, MA (US) 02339

( * ) Notice: Subject to any disclaimer, the term of this patent is extended or adjusted under 35 U.S.C. 154(b) by 803 days.

(21) Appl. No.: 11/508,602

(22) Filed: Aug. 23, 2006

(65) Prior Publication Data
US 2008/0048427 A1    Feb. 28, 2008

(51) Int. Cl.
*B60S 9/02* (2006.01)
(52) U.S. Cl. .................. 280/763.1; 280/764.1
(58) Field of Classification Search ............. 280/763.1, 280/764.1, 765.1, 766.1
See application file for complete search history.

(56) References Cited

U.S. PATENT DOCUMENTS

| | | | |
|---|---|---|---|
| 1,973,226 A | | 9/1934 | Rose et al. |
| 2,277,939 A | | 3/1942 | Thalhammer |
| 3,219,362 A | | 11/1965 | Epstein |
| 3,244,301 A | | 4/1966 | Vaughan |
| 3,310,181 A | | 3/1967 | William |
| 3,495,727 A | | 2/1970 | Long |
| 3,642,242 A | | 2/1972 | Danekas |
| 3,721,458 A | * | 3/1973 | Mitchell .................. 280/764.1 |
| 3,754,777 A | | 8/1973 | Riggs et al. |
| 3,758,154 A | | 9/1973 | Kitaguchi |
| 3,831,774 A | | 8/1974 | Moore |
| 3,881,692 A | | 5/1975 | Clarke |
| 3,897,079 A | * | 7/1975 | MacKenzie et al. ...... 280/764.1 |
| 3,913,942 A | * | 10/1975 | MacKenzie et al. ...... 280/764.1 |
| 3,924,876 A | | 12/1975 | Vaillant et al. |
| 3,930,668 A | | 1/1976 | Schuermann et al. |
| 3,945,666 A | | 3/1976 | Fritsch |
| 3,976,306 A | | 8/1976 | Nault |
| 3,990,714 A | * | 11/1976 | Hornagold ............... 280/765.1 |
| 3,998,470 A | | 12/1976 | Houston |
| 4,023,828 A | * | 5/1977 | MacKenzie et al. ...... 280/763.1 |
| 4,039,206 A | | 8/1977 | Nault |
| 4,066,234 A | | 1/1978 | Nycum |
| 4,073,454 A | | 2/1978 | Sauber |
| 4,201,137 A | | 5/1980 | Lagsdin |
| 4,204,714 A | | 5/1980 | Jacobson et al. |
| 4,266,809 A | | 5/1981 | Wuerflein |
| 4,397,479 A | | 8/1983 | Schmidt |
| 4,421,290 A | | 12/1983 | Frank |
| 4,473,239 A | * | 9/1984 | Smart ...................... 280/763.1 |
| 4,515,520 A | * | 5/1985 | Parquet et al. .............. 414/718 |
| 4,531,883 A | * | 7/1985 | Arnold ...................... 414/722 |
| 4,546,996 A | * | 10/1985 | Hanson ................... 280/764.1 |
| 4,619,369 A | | 10/1986 | Mertens |
| 4,761,021 A | * | 8/1988 | Lagsdin ................... 280/764.1 |

(Continued)

FOREIGN PATENT DOCUMENTS

CA        492912        5/1953

(Continued)

*Primary Examiner*—Jeffrey J Restifo
(74) *Attorney, Agent, or Firm*—David M. Driscoll, Esq.

(57) ABSTRACT

A stabilizer pad construction is shown in which a pair of resilient laminated pad assemblies are mounted outboard on a weldment that is pivotally supported from a stabilizer arm of a vehicle. A latch device is also illustrated in two different embodiments that prevent self-flipping of the pad, particularly from the grouser side to the resilient pad side. The latch device uses either a capture recess or a capture tab for preventing rotation and includes a handle to permit the user to manually rotate the pad.

22 Claims, 13 Drawing Sheets

U.S. PATENT DOCUMENTS

| | | | |
|---|---|---|---|
| 4,860,539 A | 8/1989 | Parrett et al. | |
| 4,889,362 A * | 12/1989 | Lagsdin | 280/763.1 |
| 5,011,184 A | 4/1991 | Loudon | |
| 5,015,008 A * | 5/1991 | Schupback | 280/764.1 |
| 5,050,904 A * | 9/1991 | Lagsdin | 280/764.1 |
| 5,051,057 A * | 9/1991 | Kremer | 414/685 |
| 5,054,812 A * | 10/1991 | Lagsdin | 280/764.1 |
| 5,154,255 A * | 10/1992 | Kiska et al. | 182/111 |
| 5,310,217 A * | 5/1994 | Paskey et al. | 280/763.1 |
| 5,338,255 A | 8/1994 | Akehurst | |
| 5,466,004 A * | 11/1995 | Lagsdin | 280/763.1 |
| 5,488,788 A | 2/1996 | Durbin | |
| 5,547,220 A * | 8/1996 | Lagsdin | 280/763.1 |
| 5,564,871 A | 10/1996 | Lagsdin | |
| 5,667,245 A * | 9/1997 | Lagsdin | 280/763.1 |
| 5,730,455 A | 3/1998 | Varnum, Sr. et al. | |
| 5,957,496 A * | 9/1999 | Lagsdin | 280/763.1 |
| 5,992,883 A * | 11/1999 | Lagsdin | 280/763.1 |
| 6,109,650 A * | 8/2000 | Lagsdin | 280/763.1 |
| 6,227,570 B1 * | 5/2001 | Martinez et al. | 280/764.1 |
| 6,270,119 B1 * | 8/2001 | Lagsdin | 280/764.1 |
| 6,422,603 B2 * | 7/2002 | Lagsdin | 280/764.1 |
| 6,471,246 B1 | 10/2002 | Lagsdin | |
| 6,634,672 B1 * | 10/2003 | Lagsdin | 280/763.1 |
| 6,726,246 B2 * | 4/2004 | Lagsdin | 280/763.1 |
| 6,986,530 B2 * | 1/2006 | Lagsdin | 280/766.1 |
| 7,040,659 B2 * | 5/2006 | Lagsdin | 280/763.1 |
| 7,073,821 B2 * | 7/2006 | Lagsdin | 280/763.1 |
| 7,267,368 B2 * | 9/2007 | Lagsdin | 280/763.1 |
| 7,401,812 B2 * | 7/2008 | Lagsdin | 280/763.1 |
| 7,425,012 B1 * | 9/2008 | Sease | 280/475 |
| 2001/0050476 A1 * | 12/2001 | Lagsdin | 280/763.1 |
| 2002/0036403 A1 * | 3/2002 | Lagsdin | 280/763.1 |
| 2003/0011181 A1 * | 1/2003 | Lagsdin | 280/763.1 |
| 2004/0046378 A1 * | 3/2004 | Lagsdin | 280/766.1 |
| 2004/0056465 A1 * | 3/2004 | Lagsdin | 280/763.1 |
| 2004/0178617 A1 * | 9/2004 | Lagsdin | 280/763.1 |
| 2008/0048427 A1 * | 2/2008 | Lagsdin | 280/763.1 |
| 2008/0122212 A1 * | 5/2008 | Lagsdin | 280/763.1 |
| 2008/0185828 A1 * | 8/2008 | Lagsdin | 280/763.1 |

FOREIGN PATENT DOCUMENTS

| | | |
|---|---|---|
| CA | 1029715 | 4/1978 |
| CA | 1036148 | 8/1978 |

* cited by examiner

STABILIZED PAD FOR VEHICLES

FIELD OF THE INVENTION

The present invention relates generally to stabilizer pads for vehicles, and more particularly to pivotally mounted stabilizer pads. The present invention also relates to an improved latch device for a stabilizer pad to prevent self-flipping of the pad.

BACKGROUND OF THE INVENTION

Construction equipment, such as earth-moving vehicles and the like, must be stabilized during construction or digging operations to limit movement of the equipment or vehicles. Typically, stabilization is provided by hydraulically actuated arms that extend from the vehicle and that have earth-engaging pads mounted on their distal ends. When the vehicle or equipment is moved into a working position, if extra stability is needed, the stabilizer arms are hydraulically operated to move from a retracted position, in which the arms generally extend upwardly and out of the way, to a user position in which the arms extend downwardly at an acute angle to the ground surface so that the pads contact the ground surface. When it is desired to move the vehicle, the arms are returned to the retracted position, and the vehicle is moved to a new operating location.

Reversible stabilizer pads for construction equipment, such as earth-moving vehicles and the like, are well-known in the prior art. Examples of such pads are found in U.S. Pat. Nos. 4,761,021 and 4,889,362. Such stabilizer pads generally have a first surface for engagement with a softer surface, such as gravel and soft earth, and a more resilient second surface on the opposite side of the first surface for engagement with harder surfaces, such as concrete or asphalt. Typically, the first surface includes flanges with grouser points that permit the pads to dig into the softer, unfinished surface formed by gravel or soft earth, to better anchor and stabilize the vehicle when encountering difficult digging conditions. The first surface is unsuitable for contact with a hard surface, since the grouser points could damage or mar the hard asphalt or concrete. The second surface of the pad typically is formed of a laminated, rubber pad for better stability on the more solid surface provided by concrete or asphalt. The stabilizer pad typically is pivotally mounted to the distal end of the hydraulically operated arm so that the pad may be rotated to contact the ground with either the first surface or the second surface.

U.S. Pat. No. 4,889,362 discloses a reversible stabilizer pad for earth moving vehicles having a generally flanged first surface for engagement with, for example, gravel and soft earth, and a resilient surface for engagement with, for example, concrete or asphalt. This patent describes the use of rubber pads on one side of the stabilizer pad for ground contact when the vehicle is on a finished surface, such as concrete or asphalt, and flanges with grouser points on the opposite side of the stabilizer pad for ground contact when the vehicle is on an unfinished but hard ground surface that requires that the pads dig into the surface in order to better anchor and stabilize the vehicle when encountering difficult digging conditions. The flange side of the pad is unsuitable for contact with a finished surface since it could damage and/or mar the finished surface. The stabilizer pad is pivotally mounted to the end of a hydraulically operated arm such that the pad may be rotated to contact the ground with either the rubber pad side or the flange side facing down to contact the ground surface. When the vehicle is moved into a working position, if extra stability is needed, the stabilizer arms, on which the pads are mounted, are hydraulically operated to move from a retracted position, in which the arms generally extend upwardly and out of the way, to a use position, in which the arms extend downward at an angle with the pads contacting the ground surface. When the vehicle is to be moved, the arms are lifted back to the retracted position, the vehicle is moved to a new operating location and the stabilizer arms are brought down into the use position again, if necessary.

In prior stabilizer pad constructions such as the one described in U.S. Pat. No. 4,889,362, there has been a tendency for the pad to self-flip when the stabilizer arm is lifted. This self-flipping generally occurs when the flange side is down such that the stabilizer pad flips from the flange side down to the rubber pad side down. This occurs because the rubber pad side is typically much heavier than the flange side. When the pad inadvertently flips sides, an operator must manually flip the pad down so that the proper side is facing down. Frequently, however, the operator does not realize that the pad has self-flipped or, even if the operator realizes it, does not bother to fix it. When this occurs, the vehicle is used with the wrong side of the stabilizer pad in contact with the ground surface, which could result in increased hazard as well as increased wear of the rubber pads, leading to premature need for replacement. The self-flipping of the pad can be remedied with a securing or engaging bolt that is required to be secured in each position of the pad and to be disassembled and re-secured when the position of the pad is to be changed. This becomes time consuming and furthermore may involve parts that are easily lost. Further, the operator simply may not use the securing pin or bolts.

U.S. Pat. No. 4,889,362 discloses an automatically operatable latch that is adapted to rotate into an engagement with the pad when the pad is in a ground engaging surface, and is furthermore adapted to automatically rotate by gravitational force out of engagement with the pad when the arm of the earth moving machine that supports the pad is lifted. In this way, when the support arm is lifted, the latch disengages from the pad and the pad is easily rotated to its opposite position. It has been found, however, that rocks, gravel and other debris frequently get caught in the automatic latch disclosed in U.S. Pat. No. 4,889,362 which can prevent the latch from releasing when the arm is lifted. In many stabilizer constructions, the pad must rotate to some extent when the arm is lifted in order to allow the piston of the arm to retract into the cylinder. Failure of the latch to release can result in damage to the arm or pad.

Accordingly, it is an object of the present invention to provide an improved stabilizer pad/arm construction for a vehicle.

A further object of the present invention is to provide a stabilizer pad/arm construction for an earth moving machine which will not flip sides unintentionally.

Another object of the present invention is to provide a stabilizer pad having improved balance to prevent unintentional flipping of the stabilizer pad.

Still another object of the present invention is to provide a stabilizer pad having an enlarged footprint, preferably using multiple resilient pads.

SUMMARY OF THE INVENTION

In accordance with the present invention there is provided a latch device for use with a support arm that pivotally supports a stabilizer pad construction having opposite one and another ground engagement positions. The latch device comprises a latch member having a peripheral latch surface; a pivot for the latch member for pivotally supporting the latch member from the support arm and an engagement lug disposed on the stabilizer pad and in a position for selective engagement with the latch member. The latch member peripheral latch surface has a capture means for accommodating the engagement lug. The engagement between the engagement lug and the capture means prevents the pad from leaving the one ground engagement position. The capture means may be a capture recess or a capture tab and interferes with the lug to limit pad movement.

In accordance with other aspects of the present invention the latch member may comprise a latch plate having a handle to enable manual rotation of the latch plate to release the engagement lug from the capture means to enable rotation of the latch plate from the one ground engagement position to the another ground engagement position; the latch member peripheral latch surface may have a first stop for limiting the clockwise rotation of the latch member; the latch member may have a weighted end for rotating the latch member so that the first stop engages the support arm; the latch member peripheral latch surface may have a second stop for limiting the counterclockwise rotation of the latch member; the handle may be disposed on the latch surface between the first and second stops; the latch surface may also form a reset node at a location opposite to the weighted end, the reset node may be engageable with the engagement lug for returning the latch member to its initial position; the stabilizer pad construction may comprise a metal weldment having a grouser point side and at least one resilient pad member on the other side thereof; the metal weldment may include at least one support wall, with the engagement lug disposed from the support wall and positioned for engagement with the latch member and may include a pair of resilient pad members separately supported from the weldment; and the capture means may be either a capture recess or a capture tab.

In accordance with the present invention there is also provided a latch device for use with a support arm that pivotally supports a stabilizer pad construction having opposite one and another ground engagement positions. The latch device comprises a latch member including a capture element; a pivot for the latch member for pivotally supporting the latch member from the support arm and an engagement lug disposed on the stabilizer pad and in a position for selective engagement with the latch member capture element. The latch member comprises a latch plate having a handle to enable manual rotation of the latch plate to release the engagement lug from the capture element to enable rotation of the latch plate from the one ground engagement position to the another ground engagement position. The engagement between the engagement lug and the latch plate prevents the pad from leaving the one ground engagement position.

In accordance with other aspects of the present invention the latch member may include a peripheral latch surface having either a capture recess or tab for accommodating the engagement lug; the latch member peripheral latch surface may have a first stop for limiting the clockwise rotation of the latch member; the latch member may have a weighted end for rotating the latch member so that the first stop engages the support arm; the latch member peripheral latch surface may have a second stop for limiting the counterclockwise rotation of the latch member and the handle may be disposed on the latch surface between the first and second stops.

In accordance with the present invention there is also provided a stabilizer pad assembly for use with a stabilizer arm, the stabilizer pad assembly comprising a pair of spaced apart plate members forming a metal weldment and being pivotally attached to the stabilizer arm by a pin extending laterally between facing surfaces of respective plate members; a pair of resilient pads each having opposed work surfaces and opposed support surfaces that are substantially transverse to the work surfaces and means integral with and extending from each resilient pad, forming with each resilient pad a unitary pad assembly. The unitary pad assemblies are respectively supported from the plate members in an outboard arrangement. Each resilient pad is moved between the opposed working surfaces and to be re-engageable with its respective plate member so as to permit selective positioning of either of the opposed working surfaces for use as a surface for ground engagement.

In accordance with other aspects of the present invention each pad may have a plurality of passages extending therethrough and the means integral may include a plurality of rod members extending respectively through the plurality of passage in the resilient pad, extending beyond opposite sides thereof, forming with the resilient pad the unitary pad assembly, and disposed for releasable engagement with the metal weldment; including securing means for holding the pad to the weldment and including a clamp bar on one or both sides of the resilient pad.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 10 is a schematic side view of the stabilizer pad with the stabilizer arm being lifted and illustrating the action of the latch member to prevent self-flipping of the stabilizer pad;

FIG. 11 is a schematic side view of the stabilizer pad illustrating the latch member being manually lifted to disengage the lock provided by the latch member;

FIG. 12 is a schematic side view of the stabilizer pad with the stabilizer arm moving downwardly and with the pad moving toward its resilient side;

FIG. 13 is a schematic side view of the stabilizer pad with its resilient side in ground engagement and with the latch reset;

FIG. 14 is a schematic side view of the stabilizer pad being moved from its resilient side toward its grouser side;

FIG. 15 is a schematic side view of the stabilizer pad with the stabilizer arm lifted and the pad being moved toward its grouser ground engagement side as depicted in FIG. 9;

FIG. 20 is a schematic side view of the stabilizer pad with the stabilizer arm being lifted and illustrating the action of the latch member to prevent self-flipping of the stabilizer pad;

FIG. 21 is a schematic side view of the stabilizer pad illustrating the latch member being manually lifted to disengage the lock provided by the latch member;

FIG. 22 is a schematic side view of the stabilizer pad with the stabilizer arm moving downwardly and with the pad moving toward its resilient side;

FIG. 23 is a schematic side view of the stabilizer pad with its resilient side in ground engagement and with the latch reset;

FIG. 24 is a schematic side view of the stabilizer pad being moved from its resilient side toward its grouser side; and FIG. 25 is a schematic side view of the stabilizer pad with the stabilizer arm lifted and the pad being moved toward its grouser ground engagement side as depicted in FIG. 19.

DETAILED DESCRIPTION

Figure 1:
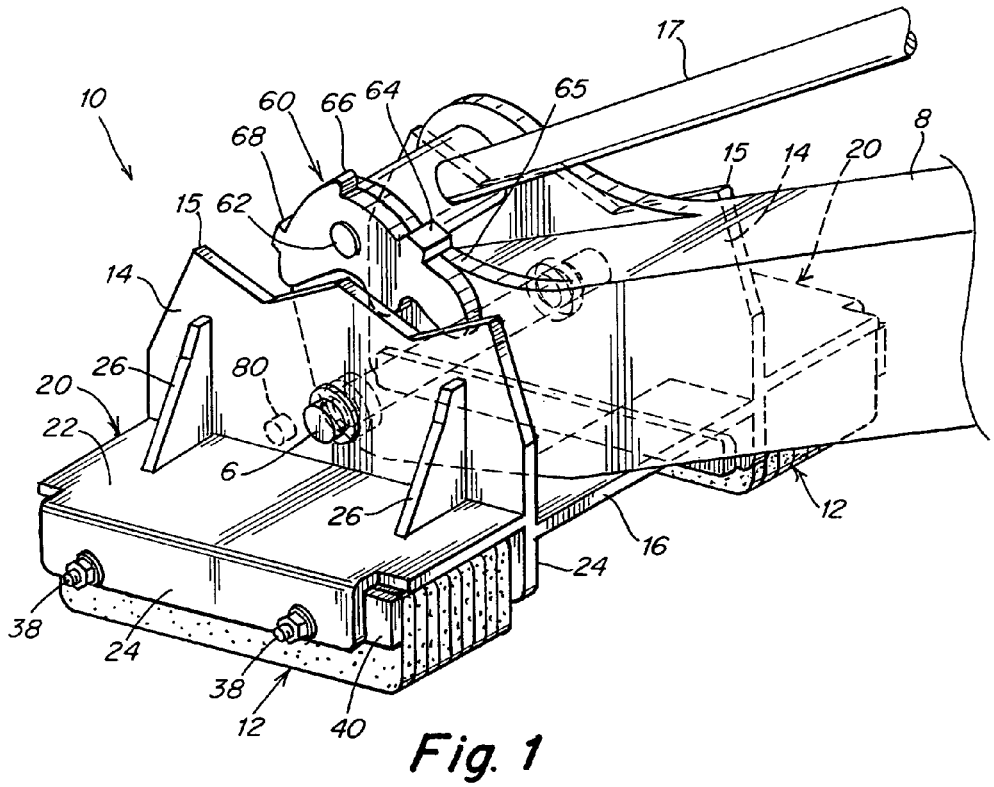
FIG. 1 of the drawings is a perspective view of a stabilizer pad constructed in accordance with the principles of the present invention and as supported from a stabilizer arm.
Figure 2:
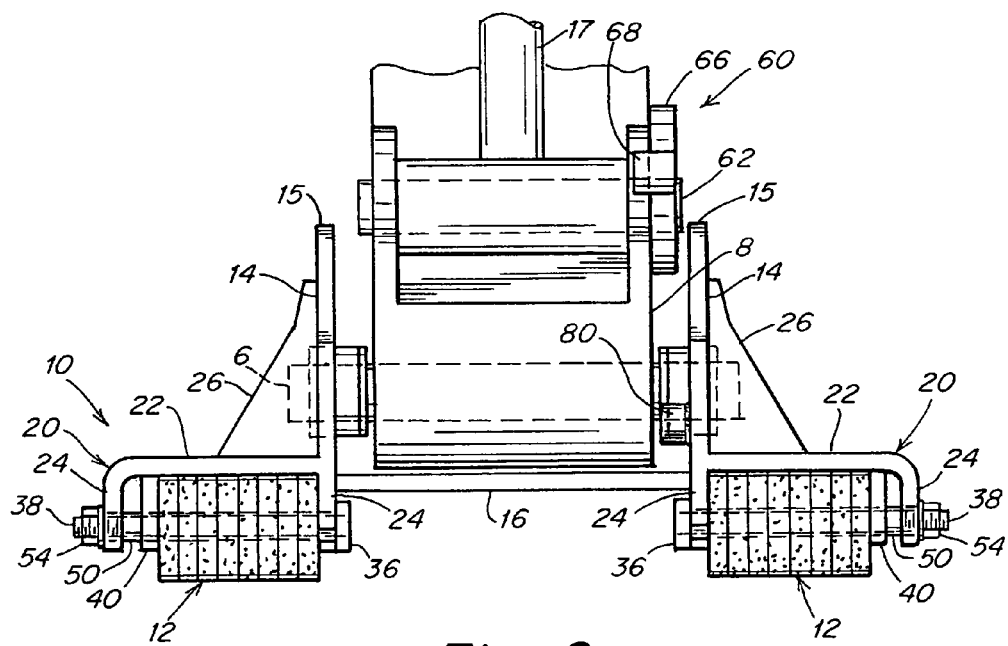
FIG. 2 is a front elevation view of the stabilizer pad depicted in FIG. 1 and supported on the stabilizer arm.
Figure 3:
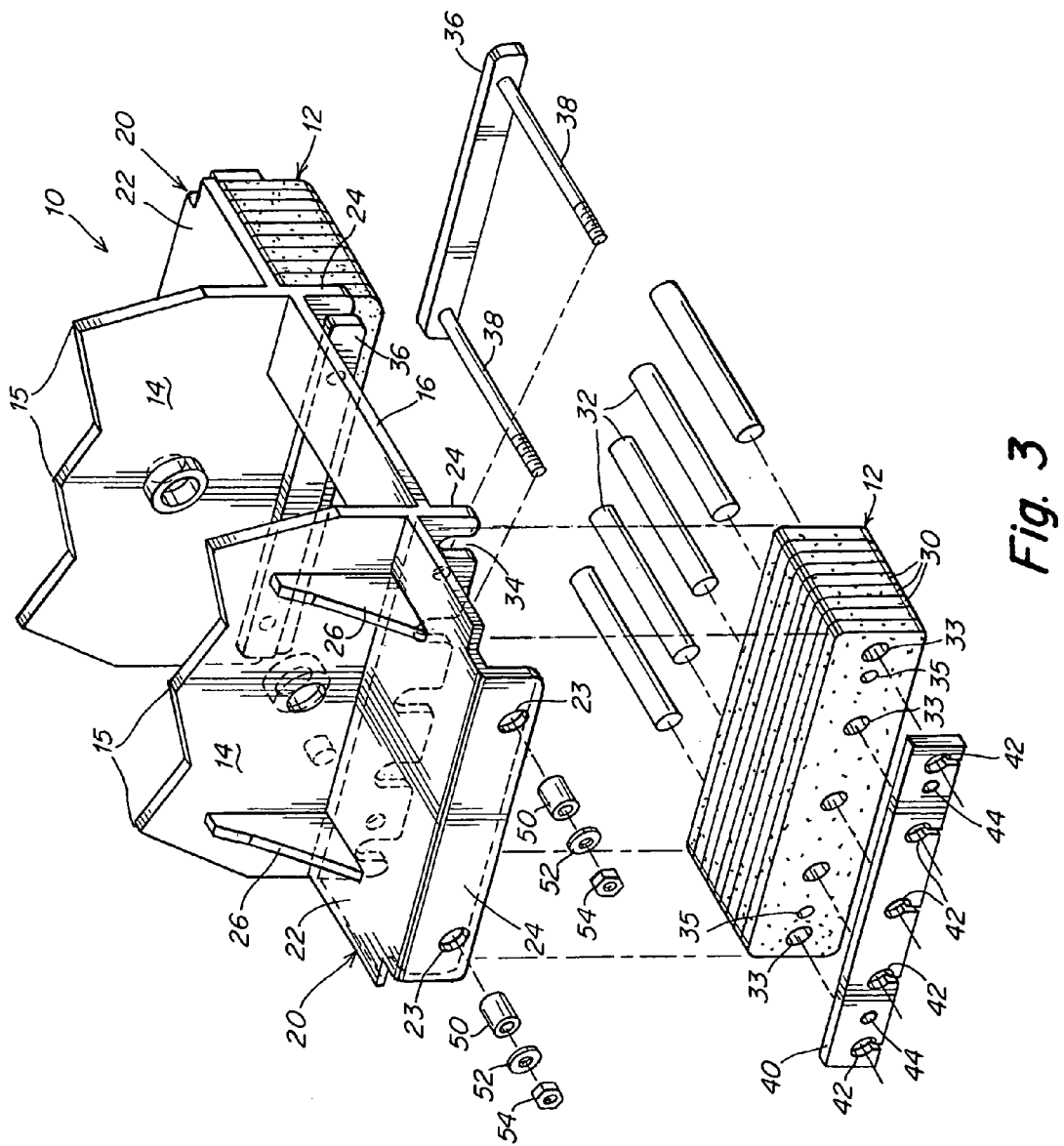
FIG. 3 is an exploded perspective view of the stabilizer pad illustrated in FIGS. 1 and 2.

Reference is now made to FIGS. 1-3 for an illustration of a stabilizer pad construction in accordance with the present invention. The stabilizer pads as illustrated herein are typically for use with earth moving equipment such as a backhoe which is illustrated by way of example in FIG. 1 of U.S. Pat. No. 6,726,246 the contents of which is hereby incorporated by reference in its entirety. It is also understood that the stabilizer pad of the present invention may also be used with other vehicles or platforms having stabilizing elements for stabilizing the vehicle or platform. FIGS. 4-8 illustrate further details of the stabilizer pad described in FIGS. 1-3. FIGS. 9-15 schematically illustrate the operation of the latch member of the present invention.

The stabilizer pad described in FIGS. 1-3 basically comprises a metal weldment 10 that supports a pair of outboard disposed resilient pads 12. The resilient pads 12 represent one of two oppositely disposed work surfaces. The resilient pads 12 are for use primarily on hard surfaces such as asphalt or concrete. The stabilizer pad described in FIGS. 1-3 also includes on its opposed side what may be considered as a flange or grouser configuration.

The metal weldment 10 is comprised of a pair of plate members 14 and an interconnecting cross plate 16 that interconnects between the respective plate members 14. As illustrated in FIGS. 1 and 3, the cross plate 16 preferably connects at only one end of the plate members. The top edge, as depicted in FIG. 1, of each of the plate members 14 defines a series of grouser points 15. These grouser points assist in gripping in surfaces such as dirt or gravel. The plate members 14, in the illustrated embodiment, are also used for support of the weldment from the stabilizer arm 8. For this purpose there is a pin 6 that extends through the end of the arm 8 and also through respective holes in the plate members 14. The pin 6 may be a conventional hardened steel pin and is appropriately supported by means of retainers or other fastening means so that the weldment is secured to the stabilizer arm and is yet free to pivot relative to the stabilizer arm at the pin 6. FIGS. 1 and 2 also show part of the hydraulics at 17 that is controlled in lifting and lowering the stabilizer arm into position.

The weldment 10 also includes a pair of opposite side pieces 20 that are each integrally formed with the corresponding plate members 14. Each of the side pieces 20 form a pocket for receiving a corresponding resilient pad 12. As shown in FIGS. 1 and 2 each of the side pieces 20 includes a top wall 22 and, integral therewith, a pair of downwardly extending sidewalls 24. The walls 22 and 24 form the aforementioned pocket for receiving the resilient pad 12. There is also preferably provided between each plate member 14 and wall 22, a pair of reinforcing ribs 26 that may be welded to the plate 14 and the wall 22.

Figure 5:
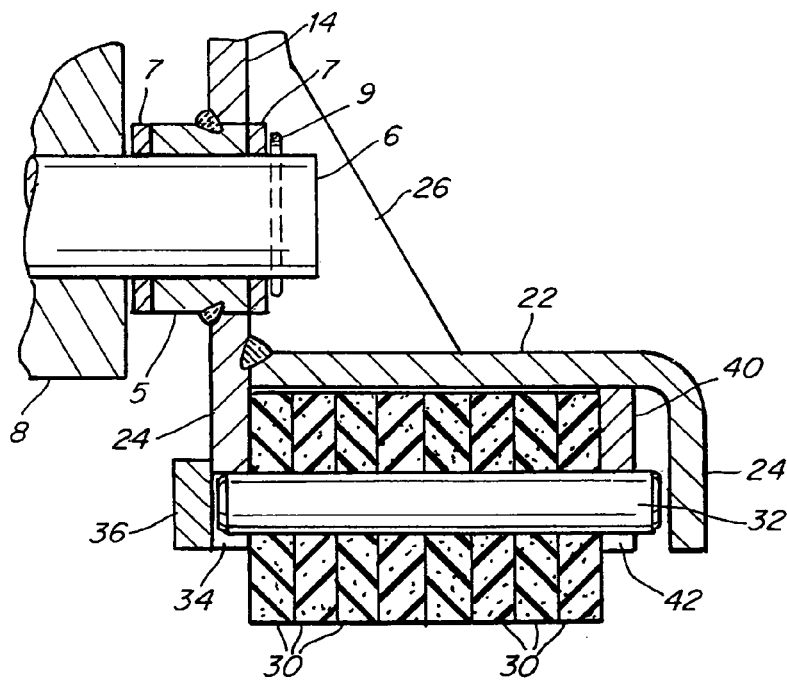
FIG. 5 is a cross-sectional view taken along line 5-5 of FIG. 4.

As indicated previously, each of the resilient pads 12 is accommodated in a pocket formed between the side walls 24 and the top wall 22 of the respective side pieces 20. Each of the resilient pads 12, as shown in, for example, FIG. 3 is comprised of a plurality of laminated layers 30 of resilient material. In the embodiment disclosed herein, these layers are maintained together by means of a plurality of pins 32 that extend through holes 33 in the laminate layers. The pins 32 are preferably force fit through the holes 33 and extend beyond the ends of the laminate layers, such as is illustrated in FIG. 5 herein. The pins 32 may also be loose fit. As also depicted in FIG. 5, the inner wall 24 includes a series of slots 34 for accommodating the very end of each of the support pins 32.

A backing plate 36 is provided having extending therefrom a pair of threaded rods 38 as depicted in FIG. 3. FIG. 3 illustrates one of the backing plates 36 exploded away from the weldment and also shows another one of the backing plates 36 in position with the threaded rods 38 extending through holes provided in the inner wall 24 as well as a pair of holes 35 through the laminated layers 30. A clamping bar 40 is also provided with a series of passages 42 for receiving the opposite ends of each of the pins 32. The pins 32 transfer forces from the resilient pad 12 to the clamping bar 40 and from there through the side pieces 20 to the plate members. The clamping bar 40 is also provided with a pair of through holes 44 for accommodating the respective threaded rods 38.

Reference is now made to the cross-sectional view of FIG. 5 which illustrates the resilient pad 12 with its associated support pins 32. The backing plate 36 is disposed on one side of the pin 32 and the outer wall 24 blocks the other side of the pin 32. In that way even if one of the force fit pins 32 should become loose, it is still maintained in a supporting position relative to the resilient pad layers 30. FIG. 5 also illustrates the clamping bar 40 in position clamping one side of the laminate layers. Regarding the support for the pivot pin 6, FIG. 5 illustrates a boss 5 that is secured to the plate member 14, a pair of washers 7 on either side of the boss and a securing cotter pin 9.

Figure 6:
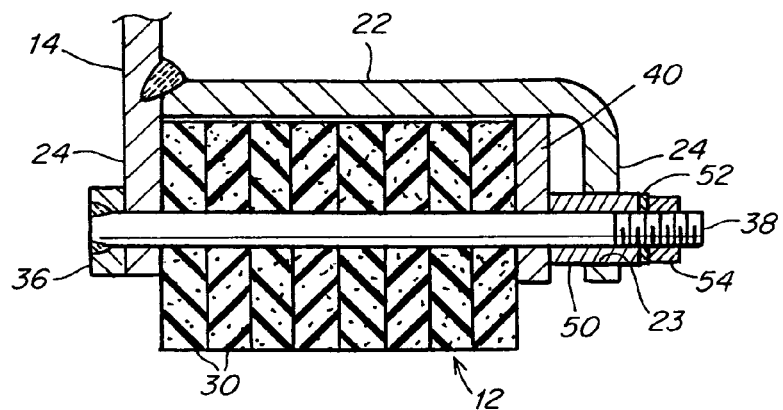
FIG. 6 is a cross-sectional view taken along line 6-6 of FIG. 4.

Reference is now made to the cross-sectional view of FIG. 6 which shows the manner in which the threaded rods 38 engage with a bushing 50, washer 52 and nut 54. The nut 54 is adapted to thread on the threaded end of the rods 38. In the embodiment disclosed two such threaded rods 38 are used. Each of the bushings 50 is adapted to pass through a corresponding hole 23 in the outer sidewall 24 (see FIG. 3). The inner end of the bushing 50 contacts the clamping bar 40 and when the nut 54 is tightened this action clamps the bushing against the bar 40 which in turn clamps all of the laminate layers together in a unitary resilient pad construction. Of course, the laminated layers are also connected as a unit by the pins 32.

Figure 7:
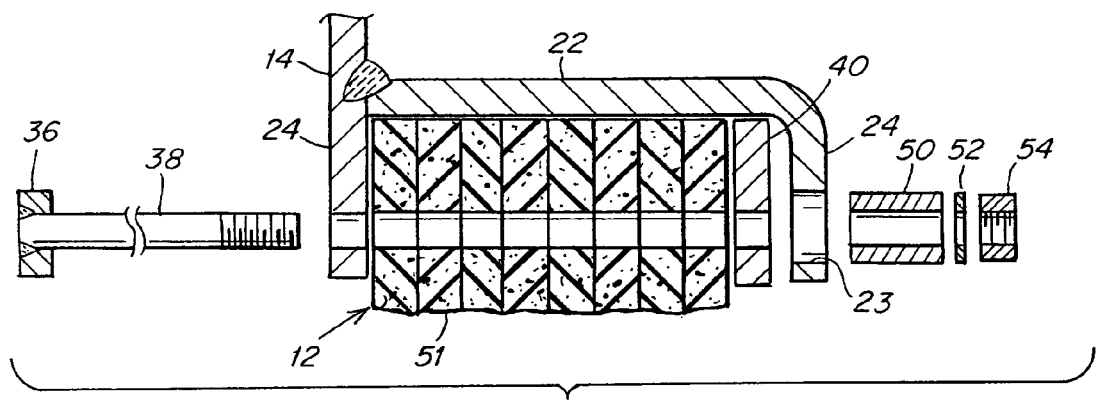
FIG. 7 is a cross-sectional view similar to that shown in FIG. 6 with the step of removing the resilient pad member from the weldment.
Figure 8:
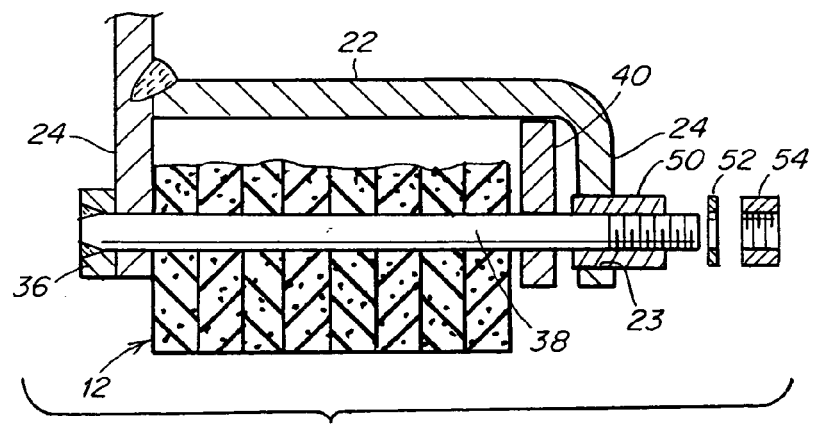
FIG. 8 is a cross-sectional view similar to that shown in FIG. 6 with the resilient pad having been reversed and resecured.

The cross-sectional view of FIG. 6 illustrates the securing rods in place and with the resilient pad 12 having little or no wear on its ground engaging surface. The cross-sectional view of FIG. 7 illustrates the pad having been worn on one side as indicated at 51. FIG. 7 also illustrates the securing rods 38 having been withdrawn and the bushing 50 and nut 54 having been disengaged. The resilient pad 12 can then be reversed in position to that illustrated in the cross-sectional view of FIG. 8 with the unused side now facing downwardly. The clamping bar or plate 40 is then placed back onto the pins 32 on the side of the pad as illustrated in FIG. 8. The assembly of the clamping bar 40, the resilient layers 30 and the securing pins 32 is then lifted into place and guided by the slots 34. The threaded rods 38 then pass through the holes 35 of the resilient pad laminate, and through the holes 44 in the clamp bar. The nuts 54 are then threaded onto the threaded rods 38 with the threaded rods 38 capturing the bushing 50 as illustrated in FIG. 8. The nuts 54 are then tightened to clamp the resilient pad in place.

Figure 16:
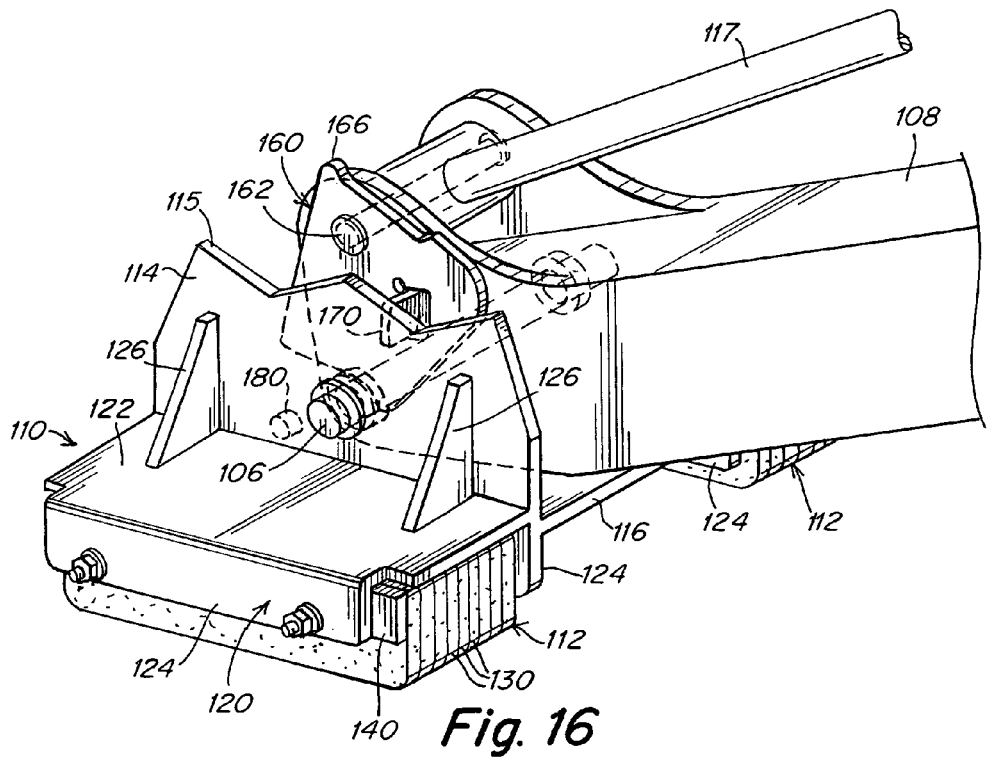
FIG. 16 of the drawings is a perspective view of an alternate embodiment of a stabilizer pad constructed in accordance with the principles of the present invention and as supported from a stabilizer arm.
Figure 17:
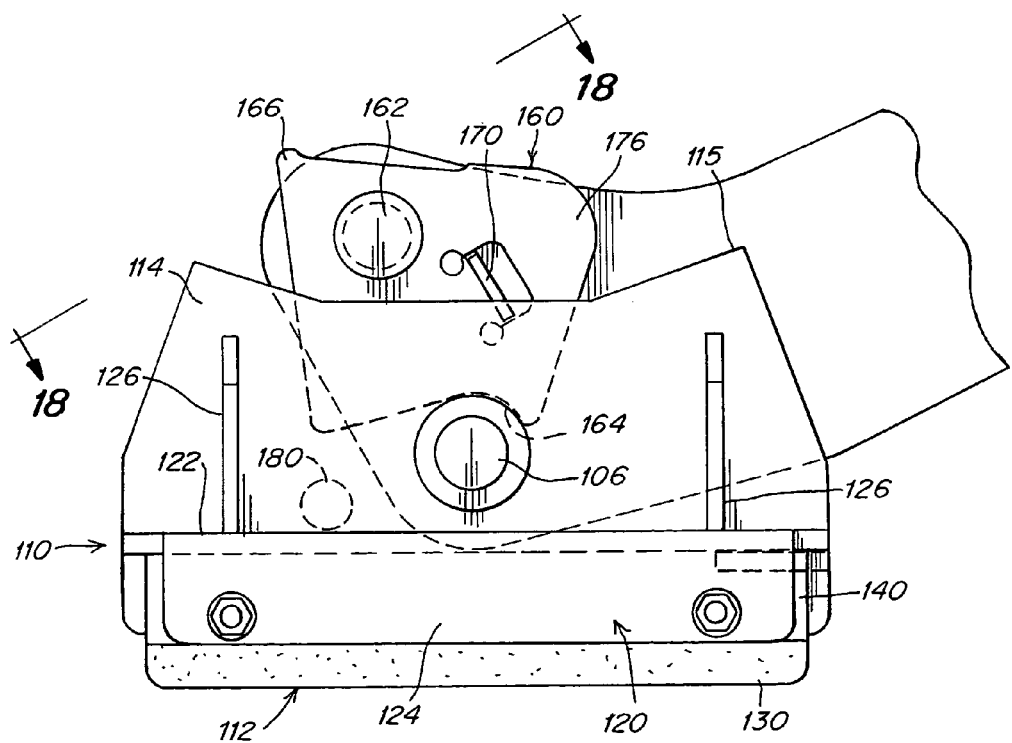
FIG. 17 is a side elevation view of the stabilizer pad depicted in FIG. 16 with the pad having its resilient side down and with the alternate latch construction in its rest position.
Figure 18:
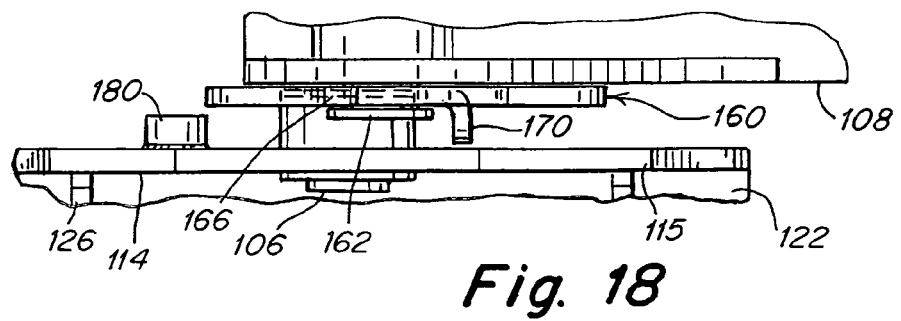
FIG. 18 is a fragmentary top view taken along line 18-18 of FIG. 17.

FIGS. 1 and 2 also show a first embodiment of the latch 60 of the present invention. FIGS. 16-18 show a second embodiment of the latch arrangement of the invention. In both cases the latch member is preferably secured to the stabilizer arm, but alternatively could be secured to the pad itself. If the latch member were secured to the pad then the engagement lug is secured to the arm. In the illustrated embodiments the latch is pivotally supported from the arm and the engagement lug is supported from the pad, but is arranged in a position so that the lug traverses across the latch. In both embodiments the latch includes a capture means or element that engages with the engagement lug to prevent self-flipping of the pad. The latch and lug may be constructed of metal or a hard plastic material.

Figure 4:
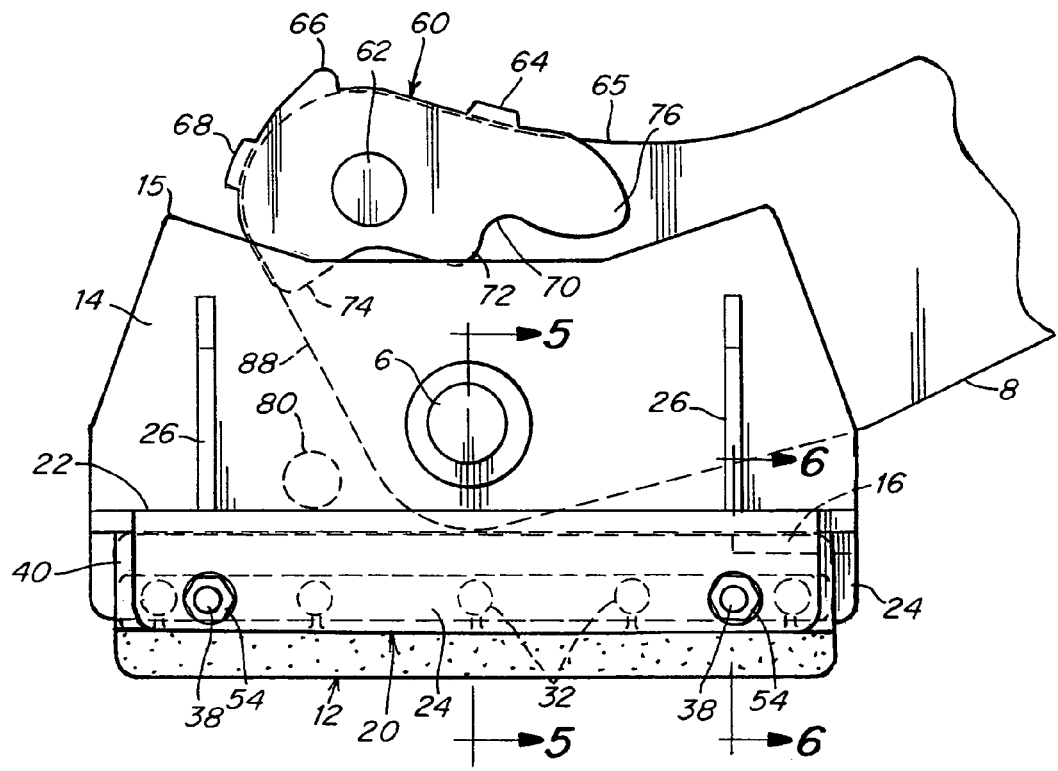
FIG. 4 is a side elevation view of the stabilizer pad depicted in FIGS. 1-3 with the pad having its resilient side down and with the latch in its rest position.

In the first embodiment the latch 60 is used to prevent self-flipping of the pad, particularly from the grouser side to the resilient pad side. The latch 60 is pivotally supported from the stabilizer arm 8 by means of the pivot pin 62. The latch can be positioned on either side of the arm 8. The latch member 60 is shown in its normal rest position in FIGS. 1 and 9. In that position the stop 64 rests upon and engages the arm surface 65, as noted in FIG. 1. FIG. 4 also illustrates the latch 60 with the stop 64 engaging the arm surface 65. The peripheral surface of the latch member 60 also includes a handle 66, a second stop 68, a capture recess 70 and nodes 72 and 74. The latch member 60 is also configured with a weighted end 76 that positions the latch as in the position of FIG. 4 with the stop 64 against the surface 65. With the weighted end 76 there is more weight on the right side of the pin 62 than the left side, as shown in FIG. 4. Alternatively, the latch member may be biased by spring loading.

Figure 9:
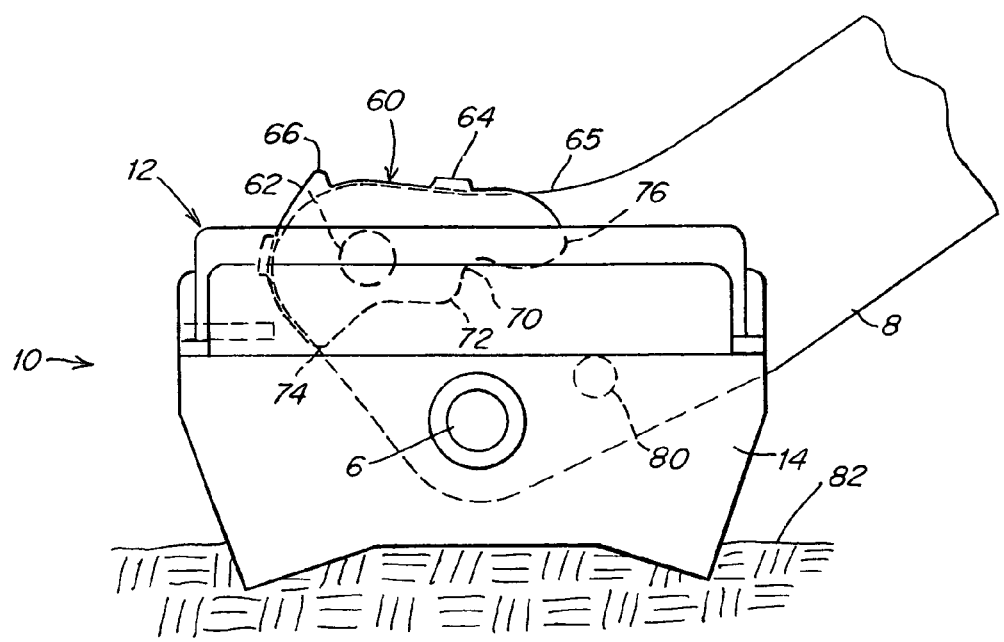
FIGS. 9-15 are a series of schematic side elevation views of the stabilizer pad in different positions with FIG. 9 illustrating the position of the pad with the grouser side down.

Reference is now made to FIGS. 9-15 which are a series of schematic diagrams illustrating the different positions of the stabilizer pad and the function of the latch member 60. The stabilizer pad 10 is illustrated in FIG. 9 with its grouser side down showing it engaged with the ground 82. In this position of the stabilizer pad 10, the latch member 60 may be considered as at its rest position. In that position the latch member 60 is out of engagement with the lug 80. The lug 80 is secured to one of the plate members 14 of the weldment, as also shown in FIG. 2.

Figure 10:
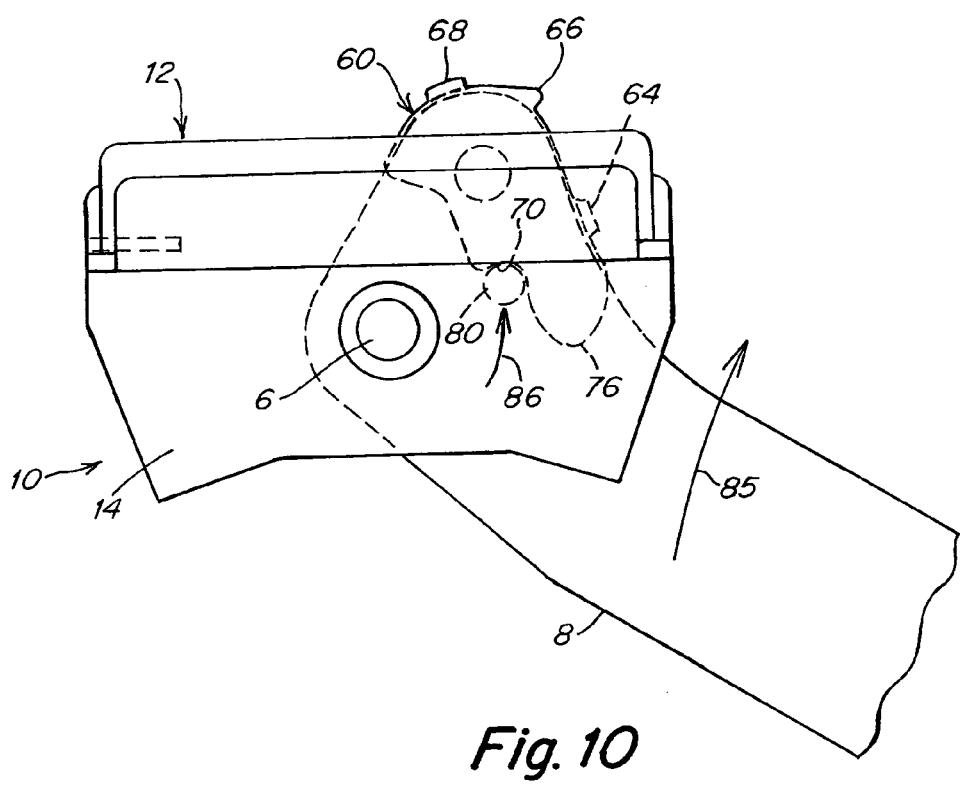

FIG. 10 illustrates a next possible sequence in which the stabilizer arm 8 has been lifted in the direction of arrow 85. This action causes a tendency of the stabilizer pad to rotate counterclockwise such as in the direction of arrow 86 in FIG. 10. This potential self-flipping action is also exacerbated by a possible suction action imposed on the grouser side of the pad as the arm is lifted and the pad attempts to disengage from the ground soil. This counterclockwise rotation is limited by virtue of the stabilizer pad lug 80 engaging in the capture recess 70. This prevents the stabilizer pad from rotating any further. In this way if the operator wishes to then lower the arm again, for subsequent engagement with a soil surface, the stabilizer pad is in the proper position.

Figure 11:
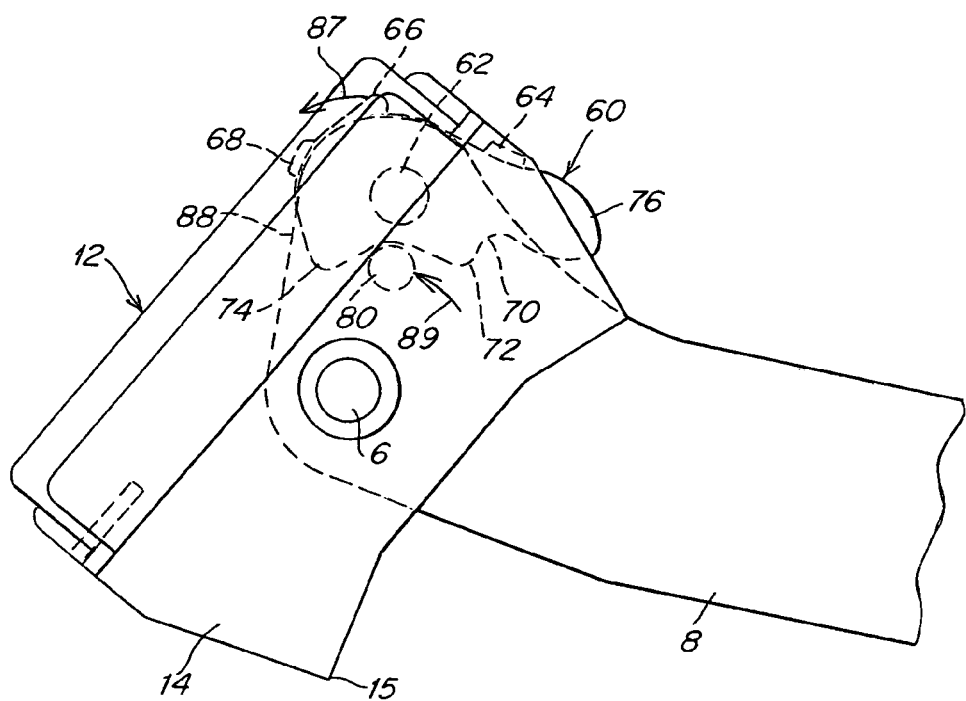

The schematic diagram of FIG. 11 illustrates a next sequence that can occur. A rotation of the stabilizer pad from the grouser side to the resilient pad side can occur quite easily by the operator manually releasing the latch member 60 which allows the pad to be rotated counterclockwise toward its resilient pad side. FIG. 11 shows the latch member 60 having been lifted by the operator manually engaging the handle 66 and pivoting the latch 60 in the counterclockwise direction indicated by the arrow 87 in FIG. 11. The counterclockwise rotation of the latch member 60 is limited by the stop 68 engaging a relatively straight surface 88 of the arm 8. This rotation of the latch member 60 causes the weighted end 76 thereof to be lifted disengaging the stop 64 from the surface 65.

By lifting the latch member 60, the lug 70 is thus out of engagement with the capture recess 70 in the latch member. FIG. 11 shows the stabilizer pad being manually rotated counterclockwise in the direction of arrow 89 with the lug 80 transitioning along the latch surface between nodes 72 and 74. Thus, by lifting the latch member manually, the stabilizer pad can then be rotated away from the grouser side toward the resilient pad side.

Figure 12:
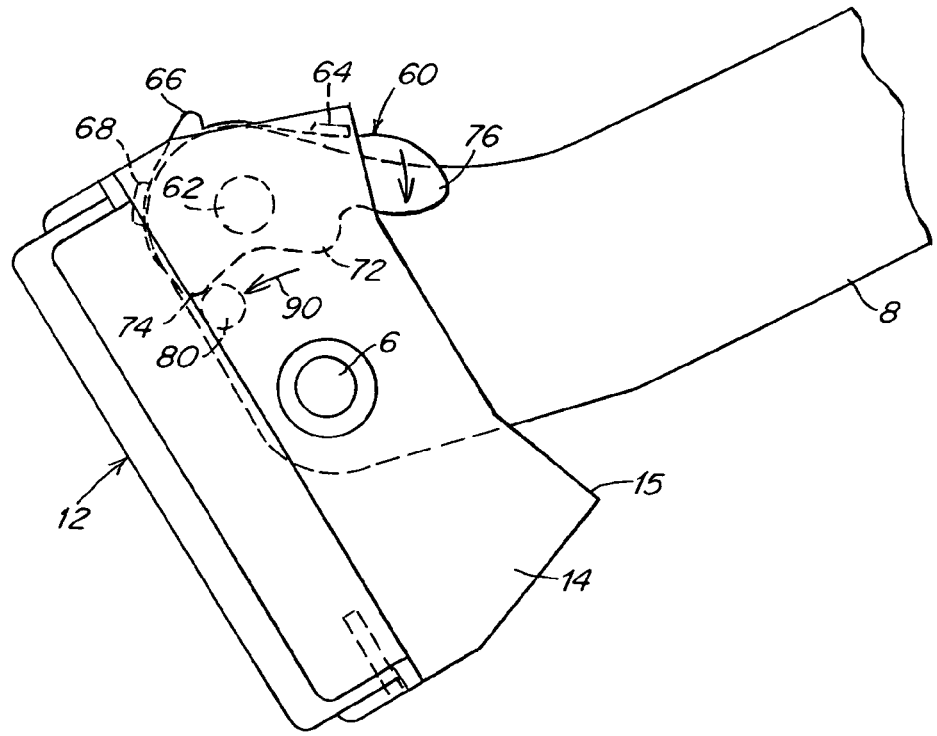

FIG. 12 illustrates the next sequence in which the stabilizer pad has been rotated further counterclockwise in the direction of arrow 90. FIG. 12 also shows that the latch member 60, as the stabilizer pad is rotated, has its weighted end 76 cause the latch member to drop to its rest position. The latch member drops as the lug 80 ramps between the nodes 72 and 74 thus resetting the latch, primarily by engagement with the node 74. The node 74 may be referred to as a reset node.

Figure 13:
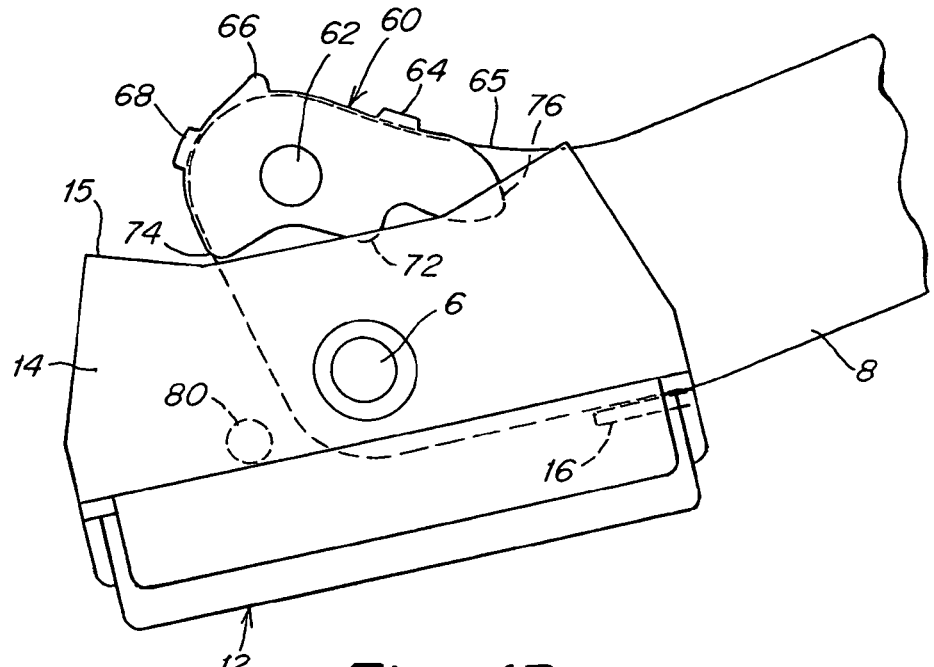

FIG. 13 illustrates the stabilizer pad now fully rotated counterclockwise so that the resilient pad side is in engagement with the ground. This would be usually used on asphalt or concrete type pavements. In this position it is noted that the latch member 60 has been reset to its normal rest position with the stop 64 resting on the stabilizer arm surface 65. The lug 80 is disengaged from the latch member and out of its way. FIG. 13 also illustrates that the cross plate 16 keeps the pad 12 from any further counterclockwise rotation.

Figure 14:
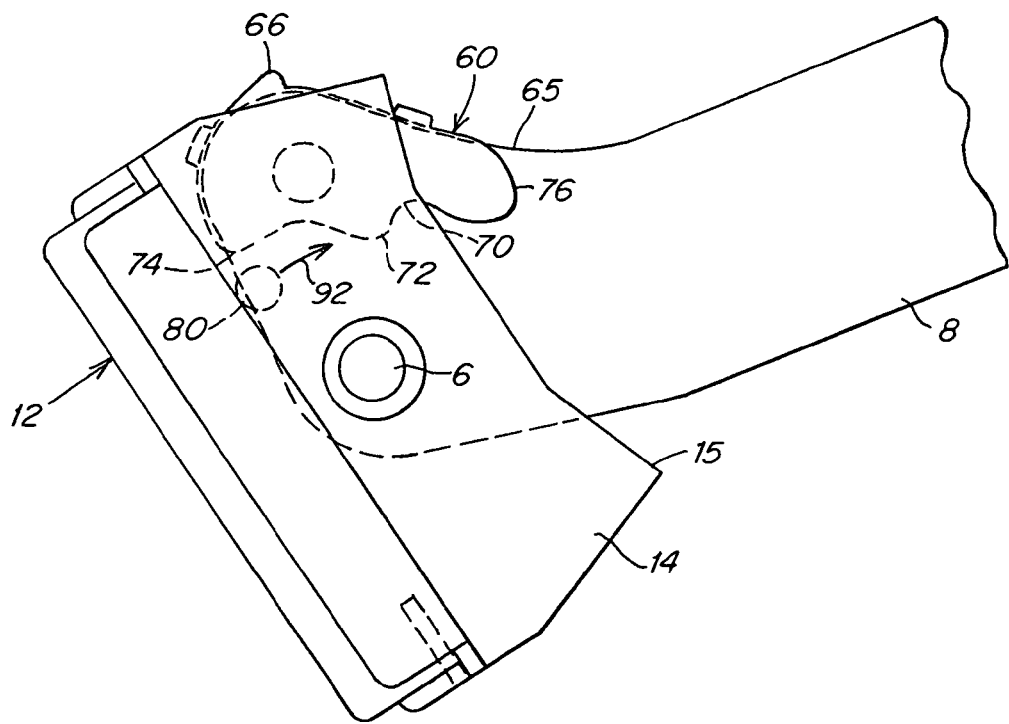

Reference is now made to the schematic diagram of FIG. 14. This shows an initial step in moving the pad from the resilient or street pad side to the grouser side. The stabilizer arm 8 may be considered as at least partially elevated. The stabilizer pad 14 is shown as being rotated clockwise in the direction of arrow 92. FIG. 14 illustrates the stabilizer pad being rotated clockwise so that the lug 80 clears the reset node 74 and ramps up toward the node 72 and the capture recess 70. In FIG. 14 the latch member 60 is still in its normal rest position.

Figure 15:
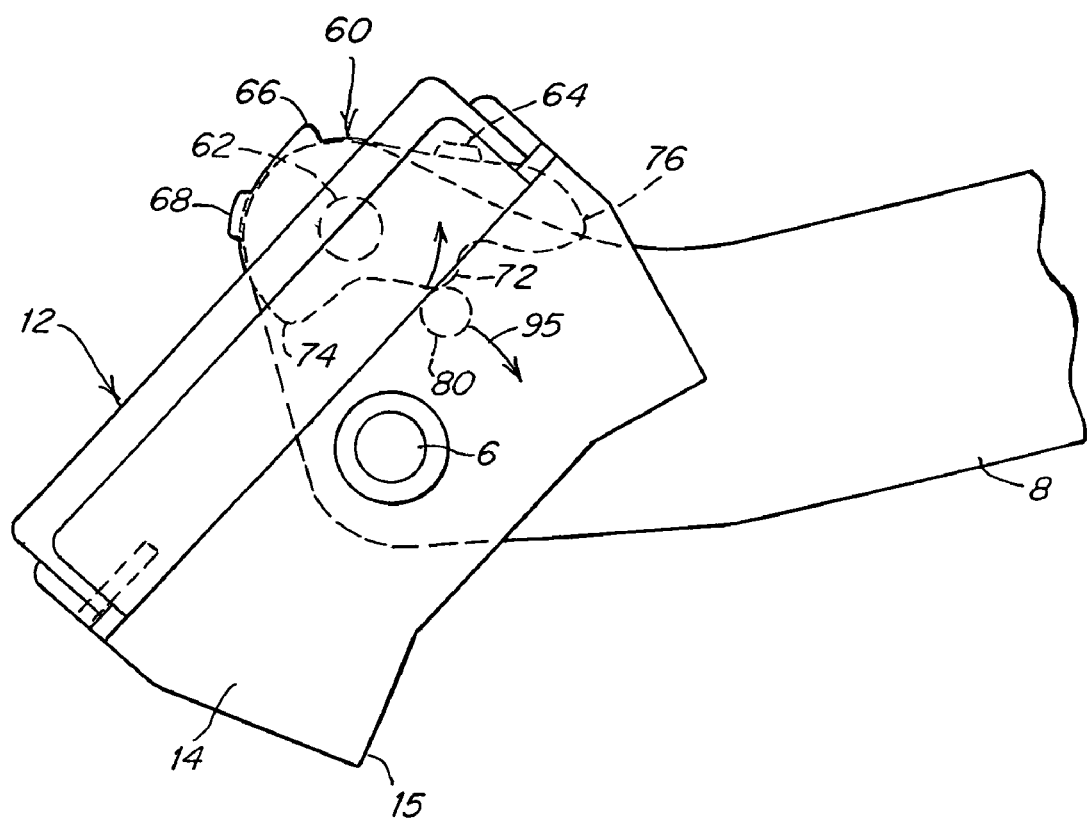

The schematic view of FIG. 15 illustrates a further clockwise rotation of the stabilizer pad in the direction of arrow 95 toward the full resilient pad side. FIG. 15 also illustrates the lug 80 ramping past the capture node 72. The lug clears the capture node 72. This causes the weighted end 76 of the latch member 60 to reset the latch to its rest position. This clockwise rotation of the stabilizer pad continues and the stop 64 contacts the arm surface 65. The pad finally assumes the position illustrated before in FIG. 9.

Reference is now made to FIGS. 16-25 for an alternate pad construction, particularly using an alternate embodiment of a latch member 160. FIGS. 16-18 illustrate the general pad construction which is similar to that described in the first embodiment in FIGS. 1-8. FIGS. 19-25 are a series of schematic diagrams illustrating the different positions of the stabilizer pad and the function of the latch member 160.

The stabilizer pad described in FIGS. 16-18 basically comprises a metal weldment 110 that supports a pair of outboard disposed resilient pads 112. The resilient pads 112 represent one of two oppositely disposed work surfaces. The resilient pads 112 are for use primarily on hard surfaces such as asphalt or concrete. The stabilizer pad described in FIGS. 16-18 also includes on its opposed side what may be considered as a flange or grouser configuration.

The metal weldment 110 is comprised of a pair of plate members 114 and an interconnecting cross plate 116 that interconnects between the respective plate members 114. As illustrated in FIG. 16, the cross plate 116 preferably connects at only one end of the plate members. The top edge, as depicted in FIG. 16, of each of the plate members 114 defines a series of grouser points 115. These grouser points assist in gripping in surfaces such as dirt or gravel. The plate members 114, in the illustrated embodiment, are also used for support of the weldment from the stabilizer arm 108. For this purpose there is a pin 106 that extends through the end of the arm 108 and also through respective holes in the plate members 114. The pin 106 may be a conventional hardened steel pin and is appropriately supported by means of retainers or other fastening means so that the weldment is secured to the stabilizer arm and is yet free to pivot relative to the stabilizer arm at the pin 106. FIG. 16 also shows part of the hydraulics at 117 that is controlled in lifting and lowering the stabilizer arm into position.

The weldment 110 also includes a pair of opposite side pieces 120 that are each integrally formed with the corresponding plate members 114. Each of the side pieces 120 form a pocket for receiving a corresponding resilient pad 112. As shown in FIG. 16, each of the side pieces 120 includes a top wall 122 and, integral therewith, a pair of downwardly extending sidewalls 124. The walls 122 and 124 form the aforementioned pocket for receiving the resilient pad 112. There is also preferably provided between each plate member 114 and wall 122, a pair of reinforcing ribs 126 that may be welded to the plate 114 and the wall 122.

As indicated previously, each of the resilient pads 112 is accommodated in a pocket formed between the side walls 124 and the top wall 122 of the respective side pieces 120. Each of the resilient pads 112, as shown in, for example, FIG. 3 is comprised of a plurality of laminated layers 130 of resilient material. In the embodiment disclosed herein, these layers may be maintained together by means of a plurality of pins that extend through holes in the laminate layers. The pins may be, as shown previously in the first embodiment, force fit through the holes and extend beyond the ends of the laminate layers for engagement with the weldment. As also depicted in FIG. 5, the inner wall 124 may include a series of slots for accommodating the very end of each of the support pills.

In this embodiment the resilient pad may be supported in substantially the same manner as discussed previously in connection with the first embodiment described herein. This includes the backing plate, threaded rods and clamping bar. In FIG. 16 the clamping bar 140 is also provided with a series of passages for receiving the opposite ends of each of the support pins. The pins transfer forces from the resilient pad 112 to the clamping bar 140 and from there through the side pieces 120 to the plate members 114. The clamping bar 140 is also provided with a pair of through holes for accommodating the respective threaded rods.

FIGS. 16-18 also show the latch member 160 of the present invention. The latch 160 is used to prevent self-flipping of the pad, particularly from the grouser side to the resilient pad side. The latch 160 is pivotally supported from the stabilizer arm 108 by means of the pivot pin 162. The latch member 160 is shown in its normal rest position in FIGS. 16 and 17. In that position the stop 164 rests upon and engages the pivot pin 106, as noted in FIG. 17. The peripheral surface of the latch member 160 also includes a handle 166. The latch member 160 is also configured with a weighted end 176 that positions the latch as in the position of FIG. 17 with the stop or stop surface 164 against the pin 106. With the weighted end 176 there is more weight on the right side of the pin 162 than the left side, as shown in FIG. 17. The latch member 160 also has a projecting capture tab 170 that extends orthogonal to the planar surface of the latch member. The tab 170 is for engagement with the lug 180 on the pad. The tab 170 may be formed by a cut-out in the plate member of the latch and is bent orthogonal to the plane of the plate member.

Figure 19:
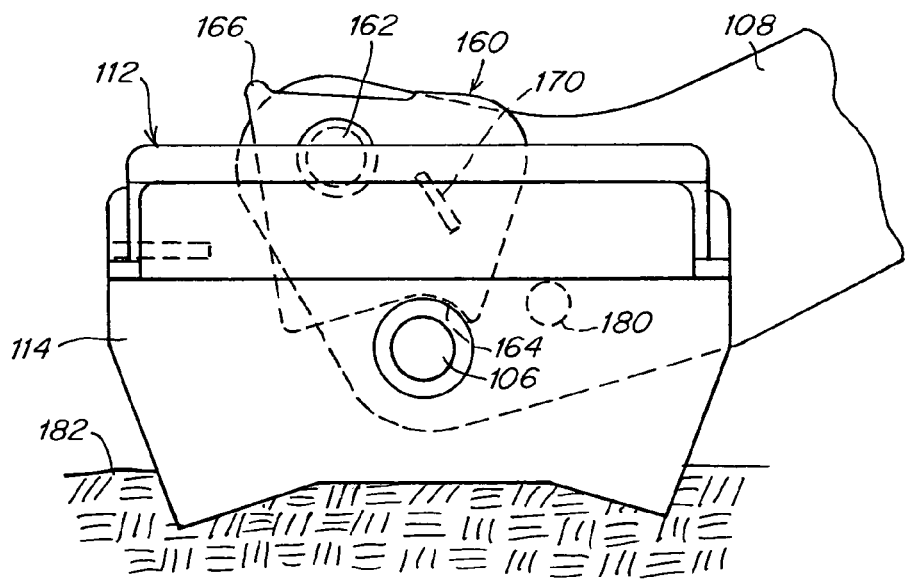
FIGS. 19-25 are a series of schematic side elevation views of the stabilizer pad of FIG. 16 in different positions with FIG. 19 illustrating the position of the pad with the grouser side down.

Reference is now made to FIGS. 9-15 which are a series of schematic diagrams illustrating the different positions of the stabilizer pad and the function of the latch member 60. The stabilizer pad 110 is illustrated in FIG. 19 with its grouser side down so that it can be engaged with a ground surface 182. In this position of the stabilizer pad 110, the latch member 160 may be considered as at its rest position. In that position the latch member 160 is out of engagement with the lug 180. The lug 180 is secured to one of the plate members 114 of the weldment, as also shown in FIG. 18.

Figure 20:
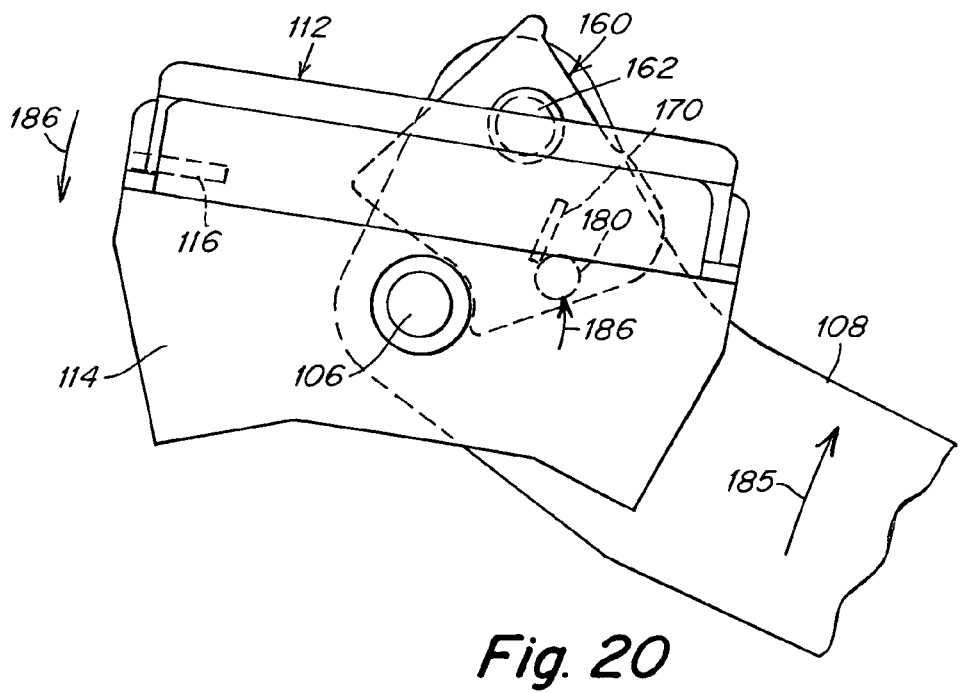

FIG. 20 illustrates a next possible sequence in which the stabilizer arm 108 has been lifted in the direction of arrow 185. This action causes a tendency of the stabilizer pad to rotate counterclockwise such as in the direction of arrows 186 in FIG. 20. This potential self-flipping action is also exacerbated by a possible suction action imposed on the grouser side of the pad as the arm is lifted and the pad attempts to disengage from the ground soil. This counterclockwise rotation is limited by virtue of the stabilizer pad lug 180 engaging the capture tab 170, as illustrated in FIG. 20 This prevents the stabilizer pad from rotating any further. In this way, if the operator wishes to then lower the arm again, for subsequent engagement with a soil surface, the stabilizer pad is in the proper position and has not flipped over to the other side.

Figure 21:
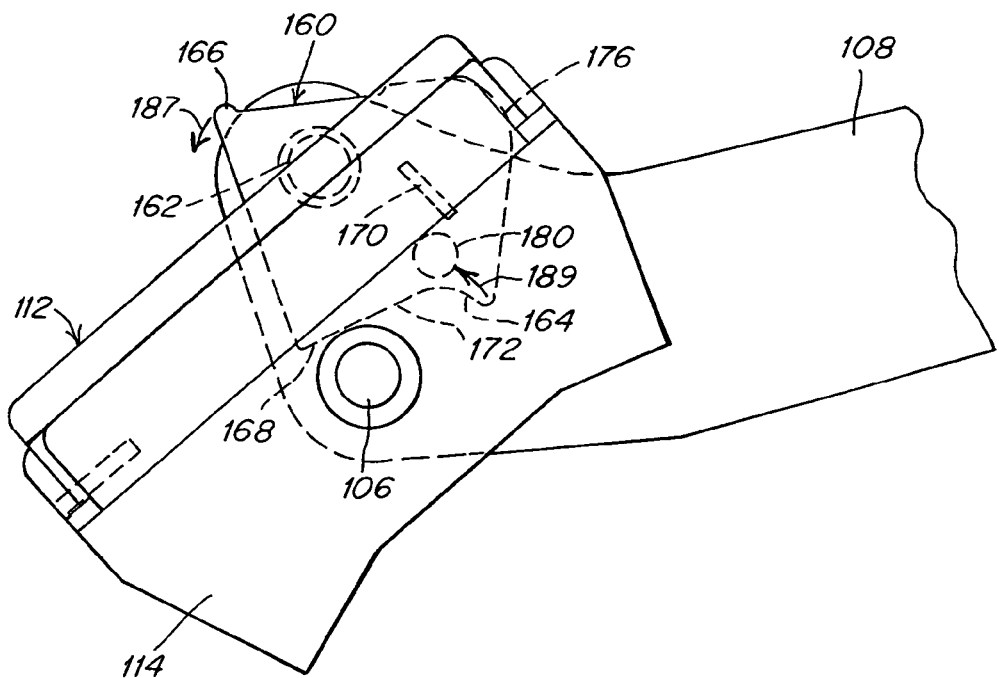

The schematic diagram of FIG. 21 illustrates a next sequence that can occur. A counterclockwise rotation of the stabilizer pad from the grouser side to the resilient pad side can occur quite easily by the operator manually releasing the latch member 160 which allows the pad to be rotated counterclockwise toward its resilient pad side. FIG. 21 shows the latch member 160 having been lifted, by the operator manually engaging the handle 166 and pivoting the latch member 160 about pivot pin 162 in the counterclockwise direction as indicated by the arrow 187 in FIG. 21. The counterclockwise rotation of the latch member 160 is limited by the stop 168 on the latch member engaging the pivot pin 106. This counterclockwise rotation of the latch member 160 causes the weighted end 176 thereof to be lifted disengaging the lug 180 from the capture tab 170. FIG. 21 shows the position with the lug 180 just separated from the tab 170.

By lifting the latch member 160, the lug 180 is thus out of engagement with the capture tab 170 of the latch member 160. FIG. 21 shows the stabilizer pad being manually rotated counterclockwise in the direction of arrow 189 with the lug 180 moving past the capture tab 170 while the surface 172 of the latch member maintains engagement with the pin 106. Thus, by lifting the latch member manually, the stabilizer pad can then be rotated away from the grouser side toward the resilient pad side.

Figure 22:
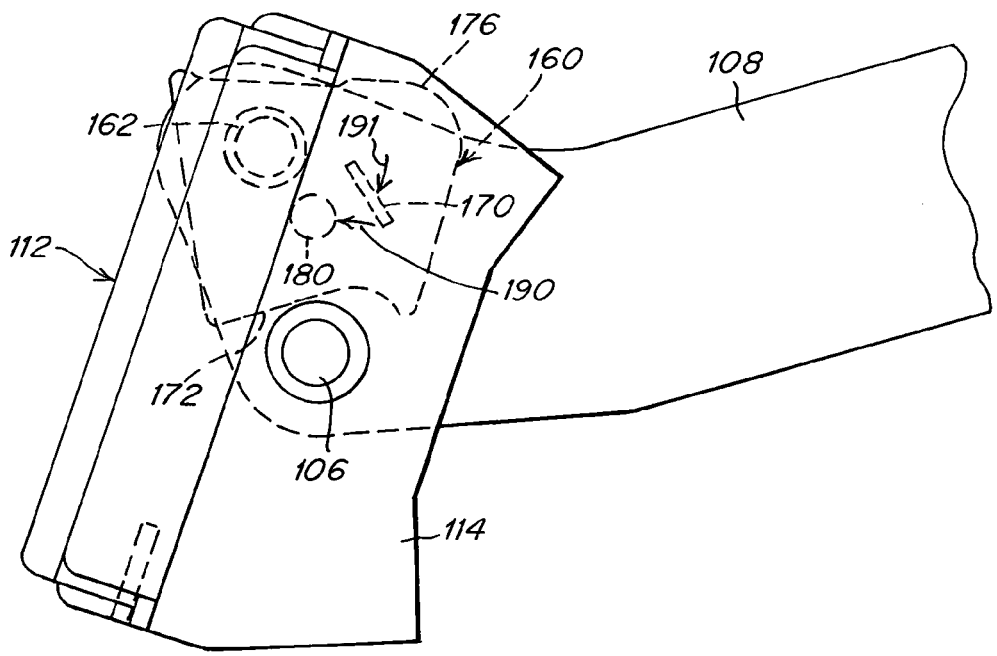

FIG. 22 illustrates the next sequence in which the stabilizer pad has been rotated further counterclockwise in the direction of arrow 190. FIG. 22 also shows that the latch member 60, as the stabilizer pad is rotated counterclockwise, has its weighted end 176 cause the latch member to drop toward its rest position, as indicated by arrow 191. The latch member drops as the surface 172 is maintained in contact with the pin 106, thus starting to reset the latch.

Figure 23:
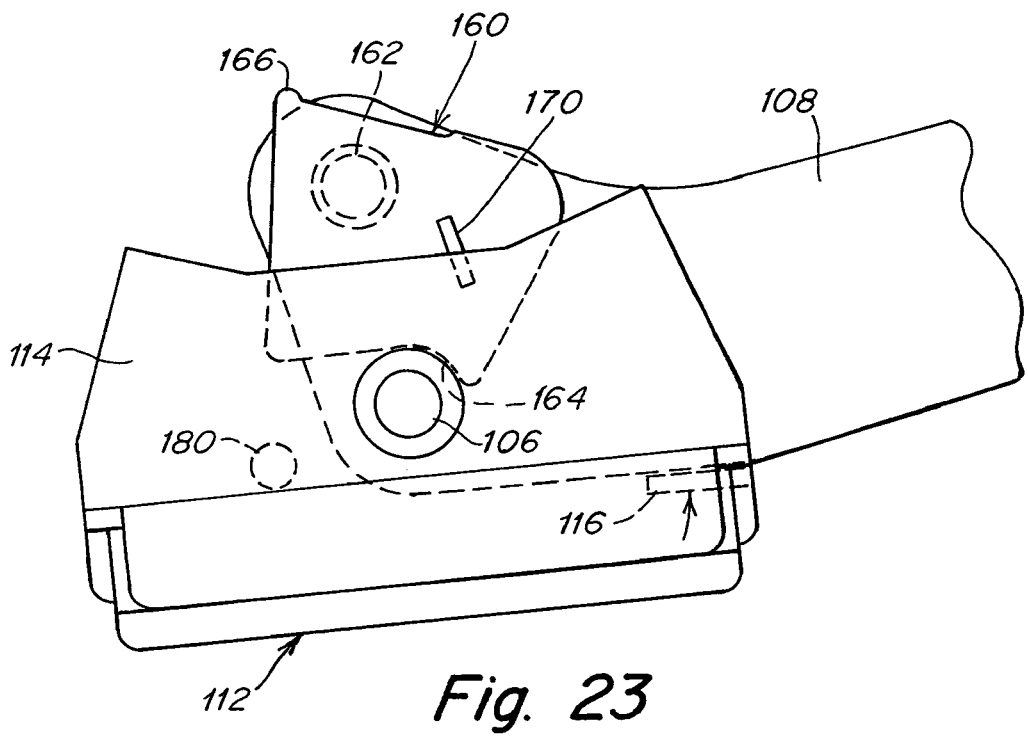

FIG. 23 illustrates the stabilizer pad now fully rotated counterclockwise so that the resilient pad side is in engagement with the ground. This would be usually used on asphalt or concrete type pavements. In this position it is noted that the latch member 160 has been reset to its normal rest position with the stop 164 resting on the stabilizer arm pin 106. The lug 180 is disengaged from the latch member and is out of its way. FIG. 23 also illustrates that the cross plate 116 keeps the pad 112 from any further counterclockwise rotation.

Figure 24:
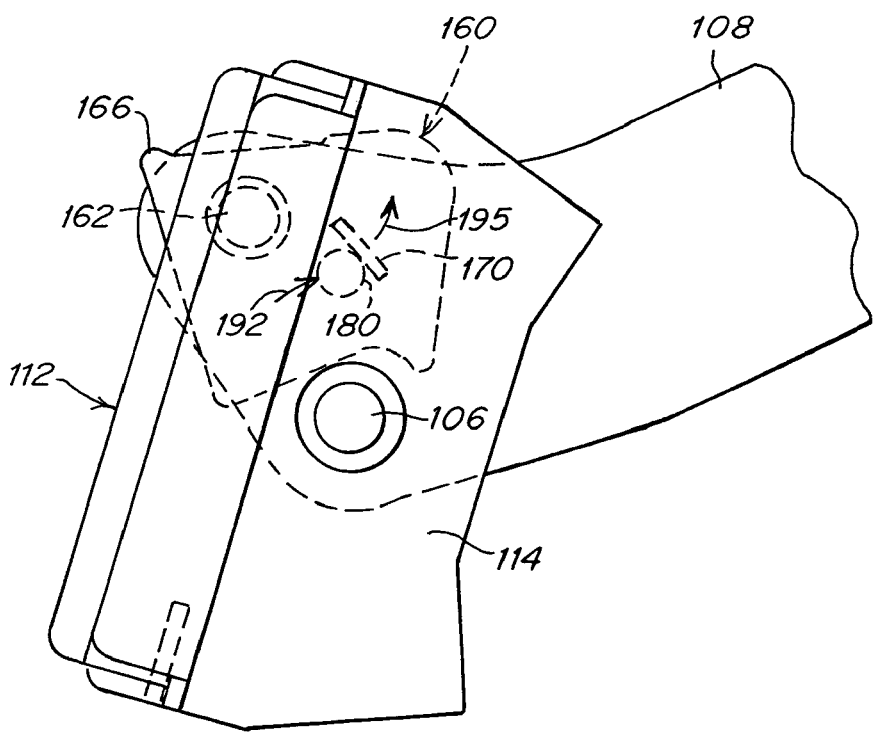

Reference is now made to the schematic diagram of FIG. 24. This shows an initial step in moving the pad from the resilient or street pad side to the grouser side. The stabilizer arm 108 may be considered as at least partially elevated. The stabilizer pad is shown as being rotated clockwise in the direction of arrow 192. FIG. 24 illustrates the stabilizer pad being rotated clockwise so that the lug 180 eventually comes into contact with the capture tab 170. This action urges the tab 170, and with it the entire latch member, in a slight counterclockwise direction, as indicated by the arrow 195. In FIG. 14 the latch member 160 is shown slightly lifted from its normal rest position.

Figure 25:
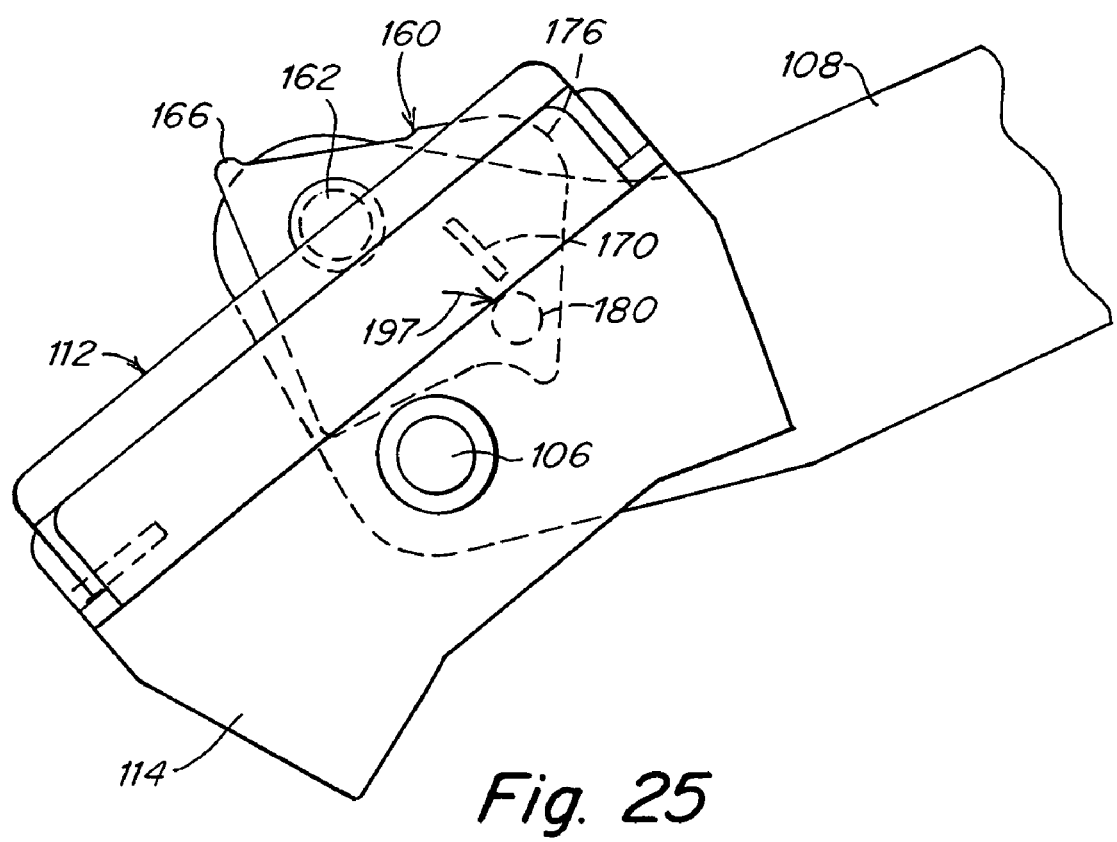

The schematic view of FIG. 25 illustrates a further clockwise rotation of the stabilizer pad in the direction of arrow 197 toward the full resilient pad side. FIG. 25 also illustrates the lug 180 transitioning past the capture tab 170. The lug 180 clears the capture tab 170. This causes the weighted end 176 of the latch member 160 to eventually reset the latch to its rest position. This clockwise rotation of the stabilizer pad continues and the stop 164 contacts the pin 106. The pad finally assumes the position illustrated before in FIG. 19.

To supplement the description herein reference is made to the following prior art patents of the same inventor, all of which are hereby incorporated by reference in their entirety U.S. Pat. Nos. 7,040,659; 6,986,530; 6,726,246; 6,634,672; 6,471,246; 6,422,603; 6,270,119; 6,109,650; 5,992,883; 5,957,496; 5,667,245; 5,547,220; 5,466,004; 5,054,812; 5,050,904; 4,889,362; 4,761,021 and 4,023,828.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A latch device for use with a support arm that pivotally supports a stabilizer pad construction that includes a rotatable support weldment having opposite one and another ground engagement positions, said latch device comprising:

a latch member having a predetermined latch surface;

a pivot for the latch member for pivotally supporting the latch member from the support arm;

an engagement lug disposed on said stabilizer pad and in a position for selective engagement with said latch member;

said engagement lug fixedly supported to said weldment so that any rotation of said weldment causes the engagement lug to rotate therewith;

said latch member latch surface having a capture means for accommodating said engagement lug;

said capture means accommodating said engagement lug in only the one of the opposite one and another ground engagement positions;

the engagement between said engagement lug and said capture means preventing the pad from leaving said one ground engagement position.

2. The latch device of claim 1 wherein said latch member comprises a latch plate having a handle to enable manual rotation of said latch plate to release said engagement lug from said capture means to enable rotation of said latch plate from said one ground engagement position to said another ground engagement position.

3. The latch device of claim 2 wherein said latch member latch surface is a peripheral latch surface that has a first stop for limiting the clockwise rotation of the latch member.

4. The latch device of claim 3 wherein said latch member has a weighted end or is spring loaded for rotating said latch member so that the first stop engages the support arm.

5. The latch device of claim 4 wherein said latch member peripheral latch surface has a second stop for limiting the counterclockwise rotation of the latch member.

6. The latch device of claim 5 wherein said handle is disposed on said latch surface between said first and second stops.

7. The latch device of claim 6 wherein said latch surface also forms a reset node at a location opposite to said weighted end, said reset node engageable with said engagement lug for returning said latch member to its initial position.

8. The latch device of claim 2 wherein said weldment comprises a metal weldment having a grouser point side and at least one resilient pad member on the other side thereof, said capture means comprising one of a capture recess and a capture tab, and said engagement lug engaging with the capture means only when the weldment is in the grouser point side for ground engagement.

9. The latch device of claim 8 wherein the metal weldment includes at least one support wall, said engagement lug disposed from said support wall and positioned for engagement with the capture means of said latch member.

10. The latch device of claim 9 including a pair of resilient pad members separately supported from said weldment.

11. The latch device of claim 1 wherein the engagement lug is fixedly supported from the weldment and the latch member comprises a latch plate supported from the stabilizer arm and having a handle to enable manual rotation of said latch plate to release said engagement lug from said capture means to enable rotation of said latch plate from said one ground engagement position to said another ground engagement position.

12. The latch device of claim 11 wherein said latch member latch surface is a peripheral latch surface that has a first stop for limiting the clockwise rotation of the latch member.

13. The latch device of claim 12 wherein said latch member has a weighted end or is spring loaded for rotating said latch member so that the first stop engages the support arm;

wherein said latch member peripheral latch surface has a second stop for limiting the counterclockwise rotation of the latch member;

wherein said handle is disposed on said latch surface between said first and second stops;

and wherein said latch surface also forms a reset node at a location opposite to said weighted end, said reset node engageable with said engagement lug for returning said latch member to its initial position.

14. The latch device of 11 wherein said weldment comprises a metal weldment having a grouser point side and at least one resilient pad member on the other side thereof, said capture means comprising one of a capture recess and a capture tab, and said engagement lug engaging with the capture means only when the weldment is in the grouser point side for ground engagement.

15. A latch device for use with a support arm that pivotally supports a stabilizer pad construction that includes a rotatable support weldment having opposite one and another ground engagement positions, said latch device comprising:

a latch member having a capture element;

a pivot for the latch member for pivotally supporting the latch member from the support arm;

an engagement lug disposed on said stabilizer pad and in a position for selective engagement with said latch member;

said engagement lug permanently fixed to said weldment so that any rotation of said weldment causes the engagement lug to rotate therewith;

said latch member comprises a latch plate having a handle to enable manual rotation of said latch plate to release said engagement lug from said latch member capture element to enable rotation of said latch plate from said one ground engagement position to said another ground engagement position;

said capture element accommodating said engagement lug in only the one of the opposite one and another ground engagement positions;

the engagement between said engagement lug and said latch plate preventing the pad from leaving said one ground engagement position.

16. The latch device of claim 15 wherein said latch member has a peripheral latch surface and said capture element comprises one of a capture recess and capture tab for accommodating said engagement lug.

17. The latch device of claim 16 wherein said latch member peripheral latch surface has a first stop for limiting the clockwise rotation of the latch member.

18. The latch device of claim 17 wherein said latch member has a weighted end for rotating said latch member so that the first stop engages the support arm.

19. The latch device of claim 18 wherein said latch member peripheral latch surface has a second stop for limiting the counterclockwise rotation of the latch member.

20. The latch device of claim 19 wherein said handle is disposed on said latch surface between said first and second stops.

21. A latch device for use with a support arm that pivotally supports a stabilizer pad construction that includes a rotatable support weldment having opposite one and another ground engagement positions, said latch device comprising:

a latch member having a latch surface;

a pivot for the latch member for pivotally supporting the latch member from one of the weldment and the support arm;

an engagement lug disposed on the other of the stabilizer arm and weldment and in a position for selective engagement with said latch member;

said engagement lug permanently supported so that any movement of either said weldment or stabilizer arm causes the engagement lug to move therewith;

said latch member latch surface having a capture means for accommodating said engagement lug;

said capture means accommodating said engagement lug in only the one of the opposite one and another ground engagement positions;

the engagement between said engagement lug and said capture means preventing the pad from leaving said one ground engagement position.

22. A latch device for use with a support arm that pivotally supports a stabilizer pad construction that includes a rotatable support weldment having opposite one and another ground engagement positions, said latch device comprising:

a latch member having a capture element;

a pivot for the latch member for pivotally supporting the latch member from one of the support arm and weldment;

an engagement lug disposed on the other of the weldment and stabilizer arm and in a position for selective engagement with said latch member;

said engagement lug permanently supported so that any movement of either said weldment or stabilizer arm causes the engagement lug to move therewith;

said latch member comprises a latch plate having a handle to enable manual rotation of said latch plate to release said engagement lug from said latch member capture element to enable rotation of said latch plate from said one ground engagement position to said another ground engagement position;

said capture element accommodating said engagement lug in only the one of the opposite one and another ground engagement positions;

the engagement between said engagement lug and said latch plate preventing the pad from leaving said one ground engagement position.

\* \* \* \* \*